UNITED STATES PATENT OFFICE.

FRITZ SINGER, OF OFFENBACH-ON-THE-MAIN, GERMANY, ASSIGNOR TO THE CORPORATION OF CHEMISCHE FABRIK GRIESHEIM ELEKTRON, OF FRANKFORT-ON-THE-MAIN, GERMANY.

MANUFACTURE OF ANTHRANOL.

999,062.     Specification of Letters Patent.     Patented July 25, 1911.

No Drawing.     Application filed February 7, 1911. Serial No. 607,154.

*To all whom it may concern:*

Be it known that I, FRITZ SINGER, doctor of philosophy, chemist, a subject of the German Emperor, and resident of Offenbach-on-the-Main, in the Grand Duchy of Hesse, Germany, with post-office address Mainstrasse 179, have invented new and useful Improvements in the Manufacture of Anthranol, of which the following is a specification.

Liebermann has described in the "*Berichte der Deutschen Chemischen Gesellschaft*" vol. 20 page 1854 a process for the manufacture of anthranol consisting in reducing anthraquinone in glacial acetic acid by means of tin and hydrochloric acid. This process can be performed smoothly but it is too expensive on a commercial scale. More profitable on a commercial scale is the process described in the specification of German Letters Patent No. 201542, consisting in reducing anthraquinone, dissolved in concentrated sulfuric acid, by means of metals.

Now I have found that anthranol can be obtained in a more advantageous manner by reducing anthraquinone, suspended in a liquid with ferrous salts. The reduction may be performed preferably in aqueous or acetic suspension. The ferrous salts can also be produced during the process of reduction. Therefore it can be used as reducing agent ferrous chlorid alone, or iron and hydrochloric acid, or iron and ferrous chlorid for instance.

It is recommendable to carry out the process in acetic acid suspension provided that the produced anthranol is to be worked up in the acetic acid solution like in the production of dianthrone for instance. By adding a solution of ferric chlorid to the ready anthranol solution and heating the mixture up to the boiling point dianthrone can be obtained from anthraquinone in one and the same process.

Example: 50 parts of fine powdered anthraquinone are heated up to 200° C. and higher temperatures in an iron-autoclave, provided with a stirrer, with 10 parts of iron and 1000 parts of a solution containing 50 per cent. of ferrous chlorid until a test portion of the melted product of reaction dissolves in caustic soda lye with yellow color. After cooling the precipitate is filtered off and washed with water. The residue is dissolved in caustic soda lye and strained directly into hydrochloric acid. The precipitated anthranol is worked up in the well known manner. It has a melting point of 152°, dissolves in caustic soda lye with yellow color and crystallizes from diluted acetic acid in shape of needles.

If the process is carried out in acetic acid suspension the heating can be performed in an open vessel or on using a reflux-condenser.

Now what I claim and desire to secure by Letters Patent is the following:

The process for the manufacture of anthranol consisting in treating anthraquinone, suspended in a liquid, with ferrous salts.

In testimony, that I claim the foregoing as my invention, I have signed my name in presence of two witnesses, this twenty-fourth day of January 1911.

FRITZ SINGER.

Witnesses:
    HERMANN WEST,
    ROBERT BIRIIL.